G. F. ECKART.
ATTACHMENT FOR TOBACCO STEMMERS.
APPLICATION FILED JAN. 27, 1916.
1,295,452.
Patented Feb. 25, 1919.
2 SHEETS—SHEET 1.
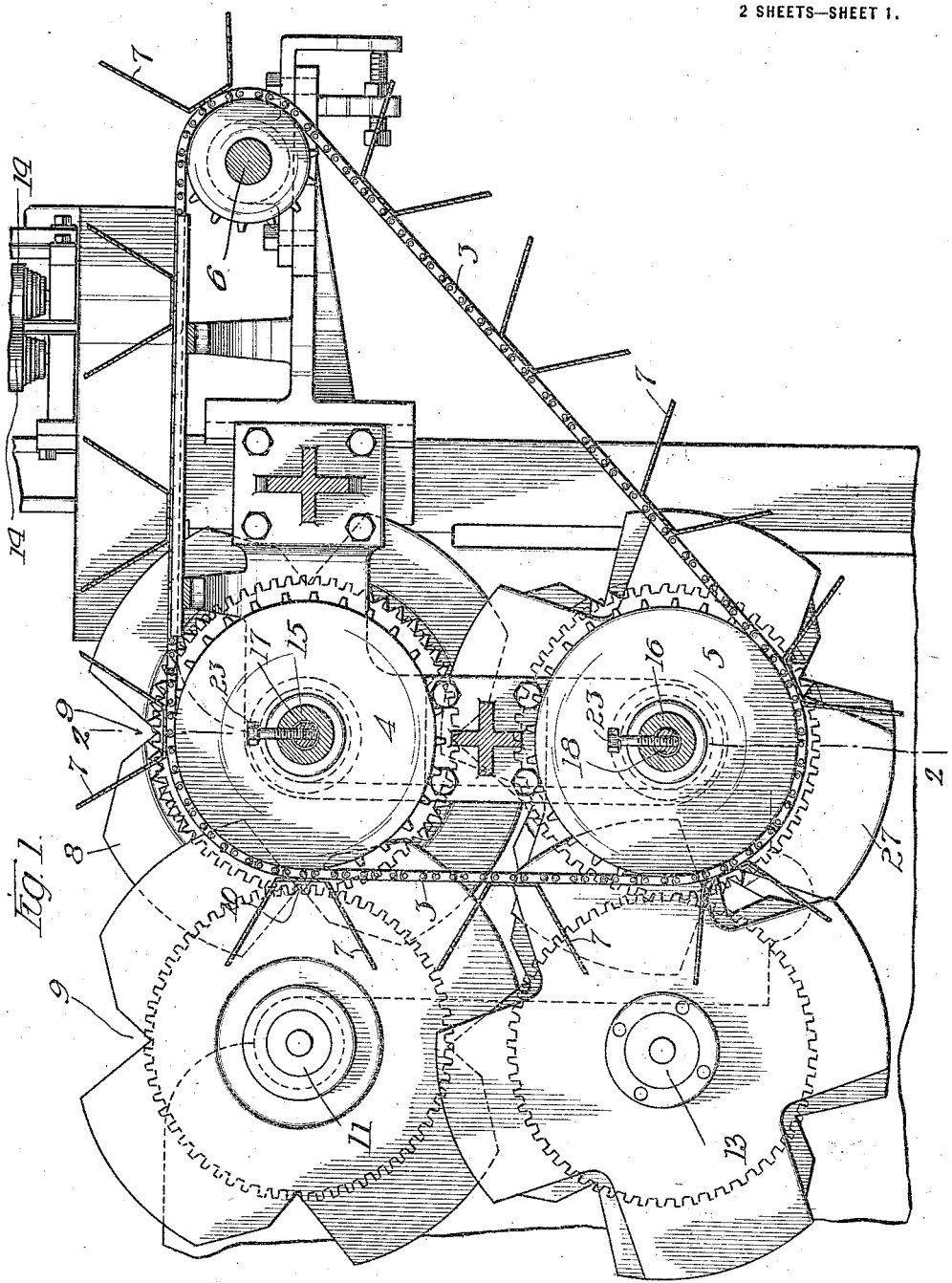

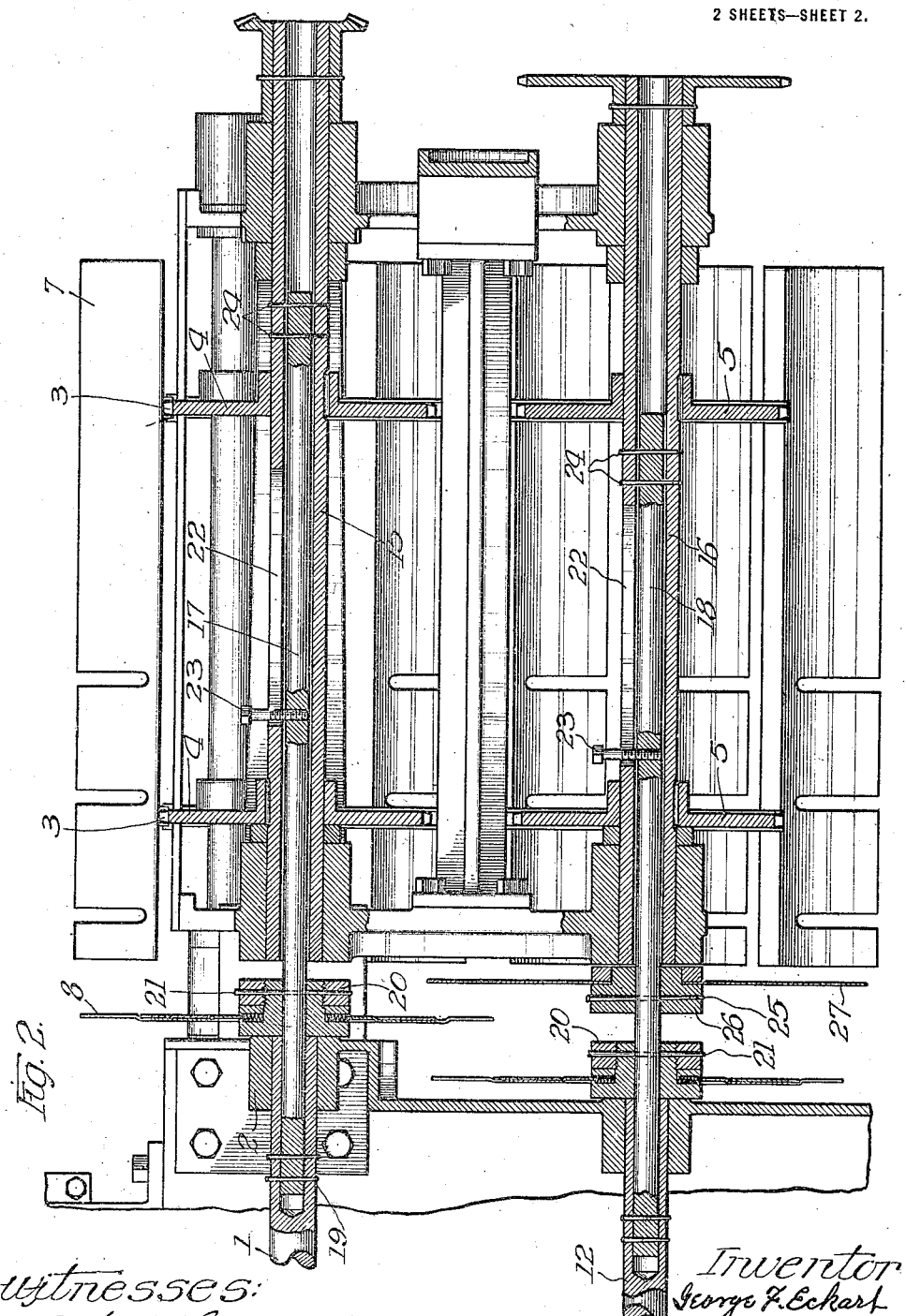

UNITED STATES PATENT OFFICE.

GEORGE F. ECKART, OF CHICAGO, ILLINOIS, ASSIGNOR TO AUTOMATIC STEMMER COMPANY, OF CHICAGO, ILLINOIS, A CORPORATION OF DELAWARE.

ATTACHMENT FOR TOBACCO-STEMMERS.

1,295,452.  Specification of Letters Patent.  Patented Feb. 25, 1919.

Application filed January 27, 1916. Serial No. 74,601.

*To all whom it may concern:*

Be it known that I, GEORGE F. ECKART, a citizen of the United States, residing at Chicago, in the county of Cook and State of Illinois, have invented certain new and useful Improvements in Attachments for Tobacco-Stemmers; and I do hereby declare the following to be a full, clear, and exact description of the invention, such as will enable others skilled in the art to which it appertains to make and use the same.

This invention relates to improvements in tobacco stemming machines, and more particularly to that type of machine which is illustrated and described in Letters Patent No. 1,044,506, issued Nov. 19, 1912.

In this type of machine the stripping is done by means of pairs of stripper-blades having coacting peripheral recesses adapted to form openings around and through which the leaves are successively drawn to separate the laminæ from the stems and mid-ribs constituting the continuations of the stems. In these machines the leaves are fed in synchronism with the successive formations of the stripper openings during rotation of the stripper blades, and the feed-mechanism requires adjustment from time to time to maintain this synchronism. As the feed mechanism comprises a plurality of parts, thereby rendering the adjustment a relatively slow operation it is desirable to avoid disturbing such adjustment when it becomes necessary to remove the stripper blades for purposes of repair or renewal thereof.

Heretofore when it was desired to remove such stripper blades for the aforesaid purposes, it was necessary to remove from the machine a portion of feed mechanism and to replace the same after the stripper blades had been remounted in the machine. This not only required considerable time but was disadvantageous in that the adjustment of the feed mechanism was apt to be disturbed thus requiring readjustment after being replaced.

The object of the present invention, therefore, is to provide means whereby the stripper blades may be completely removed from the machine and replaced without disturbing the feed mechanism in any respect.

The invention consists in the features of construction and combinations of parts hereinafter fully described and particularly claimed.

In the accompanying drawings illustrating a suitable embodiment of the invention:

Figure —1— is a fragmentary detail vertical transverse section through a portion of the feed mechanism of a tobacco stemming machine of the type aforesaid, showing the stripper blades mounted therein in accordance with my invention.

Fig. —2— is a vertical longitudinal section of the same on the line 2—2 of Fig. —1—.

In said drawings I have illustrated the machine not only as shown in the aforesaid Letters Patent, but also as illustrated and described in Letters Patent Nos. 1,110,425 and 1,110,426 both issued Sept. 15, 1914, and in my pending application Serial No. 15,027, filed March 17, 1915, the last-named Letters Patent illustrating and describing the details of construction of the stripper blades and the last-named pending application showing in full that portion of the feed mechanism which is shown in the accompanying drawings in fragment only.

Referring now to said drawings, 1 indicates a drive shaft of the machine which is journaled at one end in a bearing 2 at the forward end of the main frame of the latter, and which actuates the feed mechanism as well as the stripper blades. The said feed mechanism comprises a detachable part of the machine which may be removed bodily, the leaves being in such event fed by hand to the stripper blades if desired. This feed mechanism comprises a pair of parallel sprocket chains 3, trained over pairs of suitable sprocket wheels 4, 5 and 6 respectively, and which carry troughs 7 in which the leaves are received, and by means of which they are presented to the stripper disks or blades 8. The latter are arranged in pairs overlapping and rotating in opposite directions, each thereof being provided with a plurality of peripheral notches 9 which become opposed to form openings 10 around the stems of the leaves, the leaves being drawn longitudinally through said openings by suitable coacting mechanism, thereby stripping the laminæ from the mid-ribs of the leaves which constitute the continuations of the stems.

The shaft 1 actuates the feed mechanism and also the upper stripper disks, being suitably geared to countershaft 11 for this purpose and shaft 12 directly below shaft 1 and parallel therewith actuates the lower stripper disks, being suitably geared to shaft 13 for this purpose. The shafts 1 and 12 are geared together by the chains 3 and the result is that the several pairs of stripper disks rotate in unison and in synchronism with the travel of the troughs 7 containing the leaves. The leaves are delivered into the troughs 7 in proper position to present their stems for engagement, by what I will term the stemming mechanism which includes the stripper disks 8, by means of feed mechanism particularly illustrated and described in my aforesaid pending application, and which includes a plurality of pairs of rollers 14, between which the leaves are engaged and projected into said troughs.

The said gears 4, 5 and 6 and the parts carried thereby, together with the shafts carrying the said gears, are all disposed in a framework which is detachably secured to the main frame of the machine and is separated from the latter (except at the points of attachment thereto) by an open space in which the stripper disks 8 rotate.

The forward ends of the shafts 1 and 12 are hollow, as are also the shafts 15 and 16 carrying the sprockets 4 and 5, the last-named shafts being axially alined with said shafts 1 and 12. Mounted in said hollow shafts 1 and 15 and 12 and 16 respectively, are shafts 17 and 18, which are keyed to the shafts 1 and 12 by means of the pins 19, which are driven into registering openings in said shafts to couple the same with each other. The hubs 20 of the stripper disks 8 are similarly keyed to said shafts 17 and 18 by means of the pins 21 which may be removed and replaced at will.

Each of the shafts 15 and 16 is provided with a longitudinal slot 22 through which a set-screw 23 projects, which engages in the shaft 17 or 18 projecting into the shaft 15 or 16 respectively, said shafts 17 and 18 being further keyed to said shafts 15 and 16 by means of the pins 24 driven through openings in the outer ends of said shafts 17 and 18 and through companion openings in said shafts 15 and 16.

When it is desired to remove the stripper disks 8 the several pins 19, 21 and 24 are removed, as is also the pin 25, by means of which the hub 26 of a leaf supporting element 27 is keyed to the shaft 18, and said shafts 17 and 18 may then be moved outwardly by means of the set-screws 23 until the inner ends thereof have passed entirely out of the hubs 20 of the stripper disks, whereupon the latter may obviously be removed, repaired and replaced, and then the shafts 17 and 18 may be again moved forward to engage in said hubs. By replacing the several pins 19, 21, 24 and 25 the machine may be again operated, as will be obvious.

Thus the stripper disks may be removed and replaced in a very short time without in any way disturbing the feed mechanism of the machine and without interfering with the adjustment of the latter.

While I have illustrated and described my invention in its preferred embodiment, it will be understood that it may be variously embodied without departing from the invention as defined in the appended claims.

I claim as my invention:

1. In a tobacco stemming machine equipped with leaf-feed mechanism and stripper mechanism, the latter including rotatable stripper-disks disposed between the feed mechanism and the machine body, shafts in the latter and in said feed mechanism respectively, for actuating the latter and said stripper-disks in synchronism, said respective shafts being axially alined with each other, and connecting members axially coupling said respective shafts of said machine-body with the axially alined shafts of the feed-mechanism and detachably keyed thereto, said stripper-disks removably keyed to said connecting members between the adjacent ends of the alined shafts.

2. In a tobacco stemming machine equipped with leaf-stemming mechanism including rotatable stripper-disks, and having leaf-feed mechanism including parts rotatable on the axes of rotation of said stripper disks, shafts carrying said parts, shafts separated therefrom and disposed in axial alinement therewith, said stripper disks disposed between the opposed ends of said respective shafts, and connecting members detachably and relatively non-rotatably engaged with said respective shafts and carrying said stripper disks.

3. In a tobacco stemming machine equipped with stripper-mechanism and feed-mechanism, and having a drive-shaft and a plurality of counter-shafts parallel therewith, all of said shafts common to said stripper mechanism and said feed-mechanism, said shafts divided between their ends to provide open spaces, coupling members detachably and relatively non-rotatably engaged with the respective portions of said several parts of said shafts and each carrying a portion of said stripper mechanism.

4. In a tobacco stemming machine equipped with stripper-mechanism including stripper disks and feed-mechanism, and having a drive-shaft and a plurality of counter-shafts carrying said stripper disks parallel therewith, each of said counter-shafts comprising two separated axially alined parts and a detachable coupling-member interposed therebetween and adapted to be moved relatively thereto to provide an open space for the removal of the stripper disks, the said removable parts being carried by said coupling members.

5. In a tobacco stemming machine equipped with stripper-mechanism including stripper disks and feed-mechanism, and having a drive-shaft and a plurality of counter-shafts carrying said stripper disks parallel therewith, each of said counter-shafts comprising two separated axially alined hollow parts and a detachable coupling-member interposed therebetween and adapted to be telescopically moved relatively thereto to provide an open space for the removal of the stripper disks, the said removable parts being carried by said coupling members.

6. In a tobacco stemming machine equipped with stripper-mechanism including stripper disks and feed-mechanism, and having a drive-shaft and a plurality of counter-shafts carrying said stripper disks parallel therewith, each of said counter-shafts comprising two separated axially alined hollow parts and a detachable coupling-member interposed therebetween and adapted to be telescopically moved relatively thereto to provide an open space for the removal of the stripper disks, the said removable parts being carried by said coupling members, there being a longitudinal slot in one of said shafts, and a lateral projection on said coupling member engaging in said slot and projecting outwardly from the circumferential face of said slotted member for imparting longitudinal movement to said coupling member to disengage the same from the companion part of said shaft, and means for securing said slotted member and said removable parts to said coupling member in accurate alinement with each other.

In testimony whereof I have signed my name in presence of two subscribing witnesses.

GEORGE F. ECKART.

Witnesses:
H. W. GILLES,
R. E. HORNER.

Copies of this patent may be obtained for five cents each, by addressing the "Commissioner of Patents, Washington, D. C."